(12) United States Patent
Snead

(10) Patent No.: US 8,448,029 B2
(45) Date of Patent: May 21, 2013

(54) MULTIPROCESSOR SYSTEM HAVING MULTIPLE WATCHDOG TIMERS AND METHOD OF OPERATION

(75) Inventor: James N. Snead, Eyota, MN (US)

(73) Assignee: LSI Corporation, Milpitas, CA (US)

( * ) Notice: Subject to any disclaimer, the term of this patent is extended or adjusted under 35 U.S.C. 154(b) by 114 days.

(21) Appl. No.: 12/401,669

(22) Filed: Mar. 11, 2009

(65) Prior Publication Data

US 2010/0235558 A1  Sep. 16, 2010

(51) Int. Cl.
*G06F 11/00* (2006.01)

(52) U.S. Cl.
USPC .......................................................... 714/55

(58) Field of Classification Search
USPC .......................................................... 714/55
See application file for complete search history.

(56) References Cited

U.S. PATENT DOCUMENTS

| | | | | |
|---|---|---|---|---|
| 4,956,842 A | * | 9/1990 | Said | 714/815 |
| 5,333,285 A | * | 7/1994 | Drerup | 714/23 |
| 5,437,047 A | * | 7/1995 | Nakamura | 709/201 |
| 6,112,320 A | * | 8/2000 | Dien | 714/51 |
| 7,162,666 B2 | * | 1/2007 | Bono | 714/51 |
| 7,194,665 B2 | * | 3/2007 | Gulick | 714/47.1 |
| 7,350,117 B2 | * | 3/2008 | Garcia | 714/55 |
| 7,689,875 B2 | * | 3/2010 | Cahill et al. | 714/55 |
| 7,958,396 B2 | * | 6/2011 | Chitsaz et al. | 714/31 |
| 8,108,733 B2 | * | 1/2012 | Richmond | 714/43 |
| 2003/0204792 A1 | * | 10/2003 | Cahill et al. | 714/55 |
| 2005/0223302 A1 | * | 10/2005 | Bono | 714/55 |
| 2009/0187792 A1 | * | 7/2009 | Wagner | 714/39 |

* cited by examiner

*Primary Examiner* — Amine Riad

(57) ABSTRACT

A multiprocessor system with multiple watchdog timers, the timers causing all the processors in the system to concurrently process a common interrupt signal asserted by any of the watchdog timers timing out. The processors, in response to the common interrupt signal, store data residing in their local memories into a memory common to all the processors. The stored data is then stored in a permanent storage device for later analysis. Thereafter, all of the processors are reset.

16 Claims, 3 Drawing Sheets

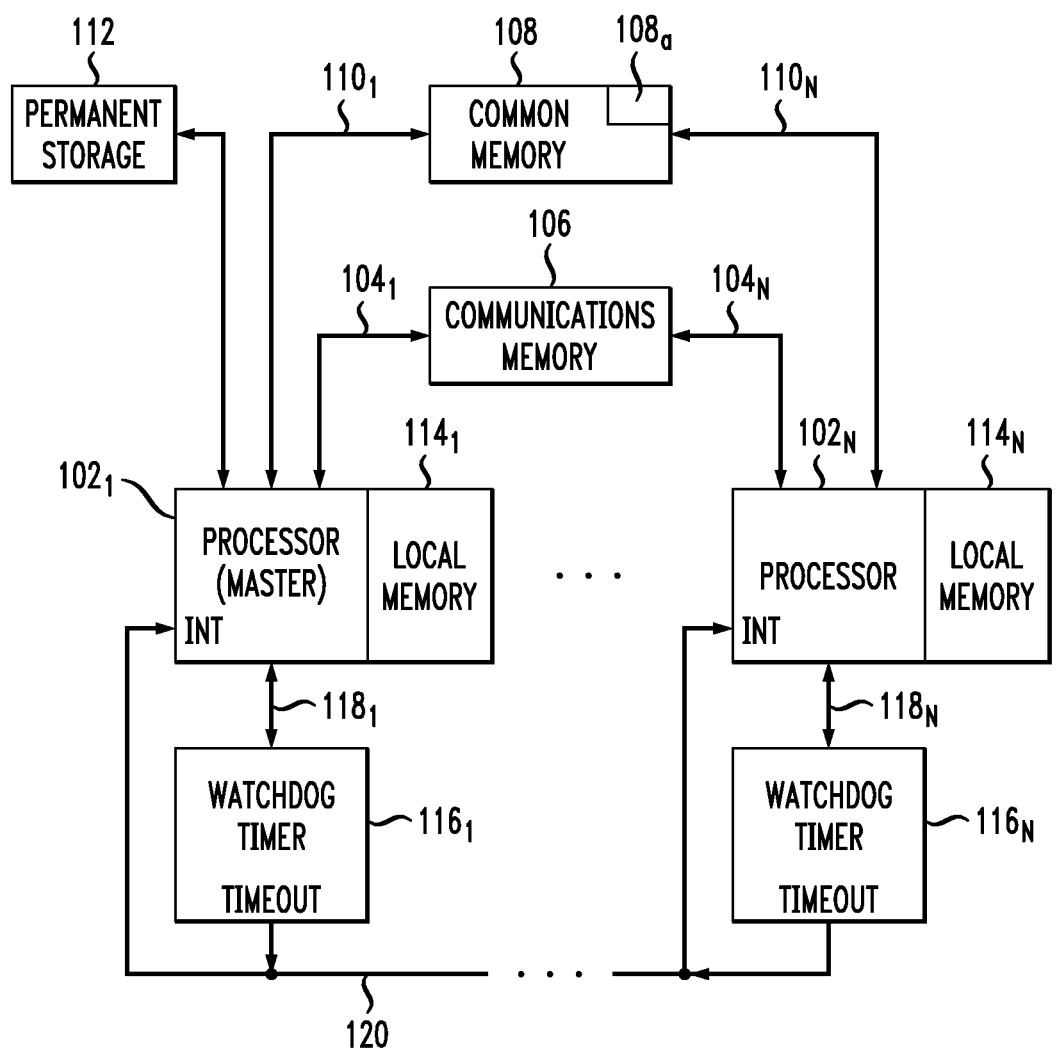

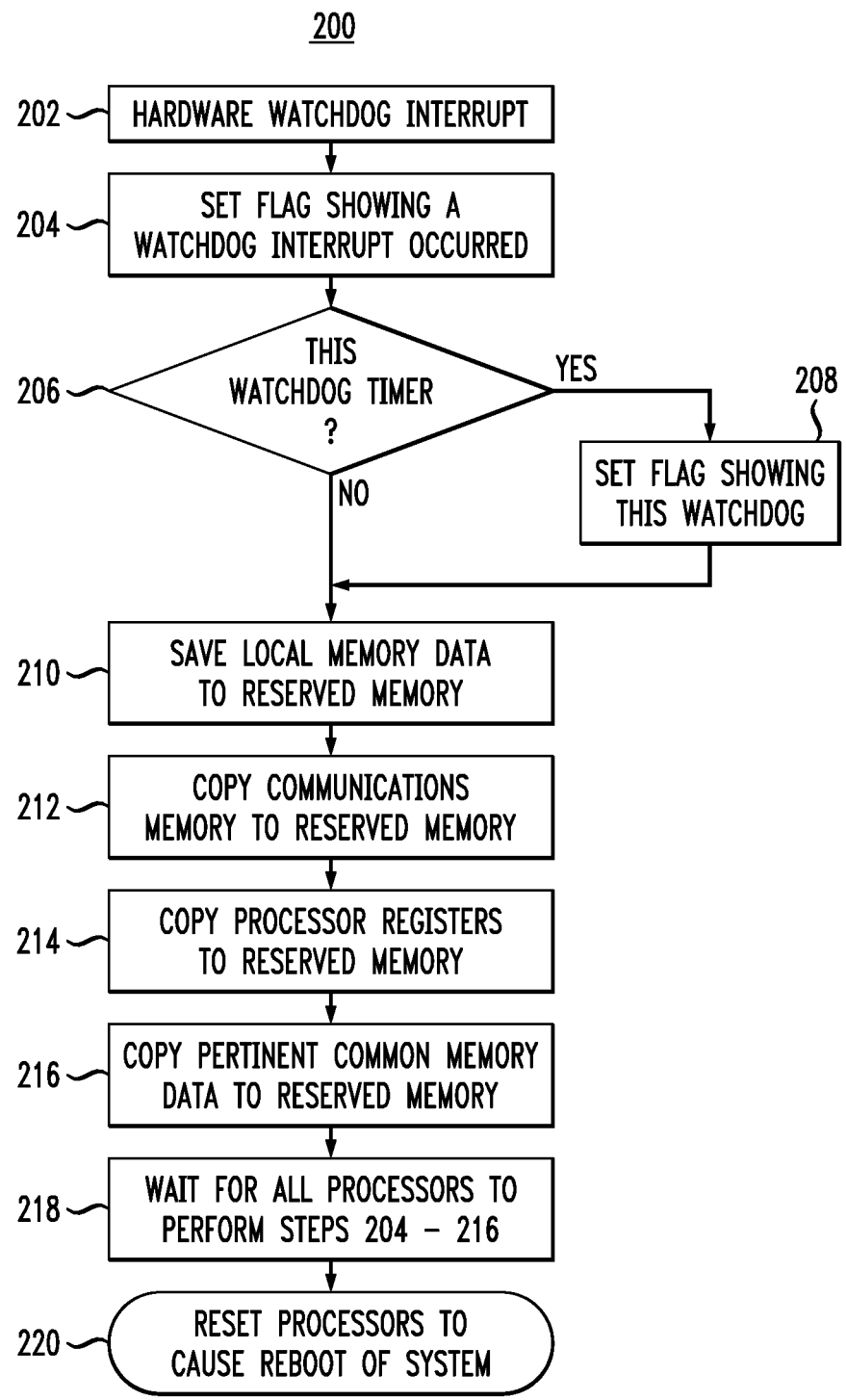

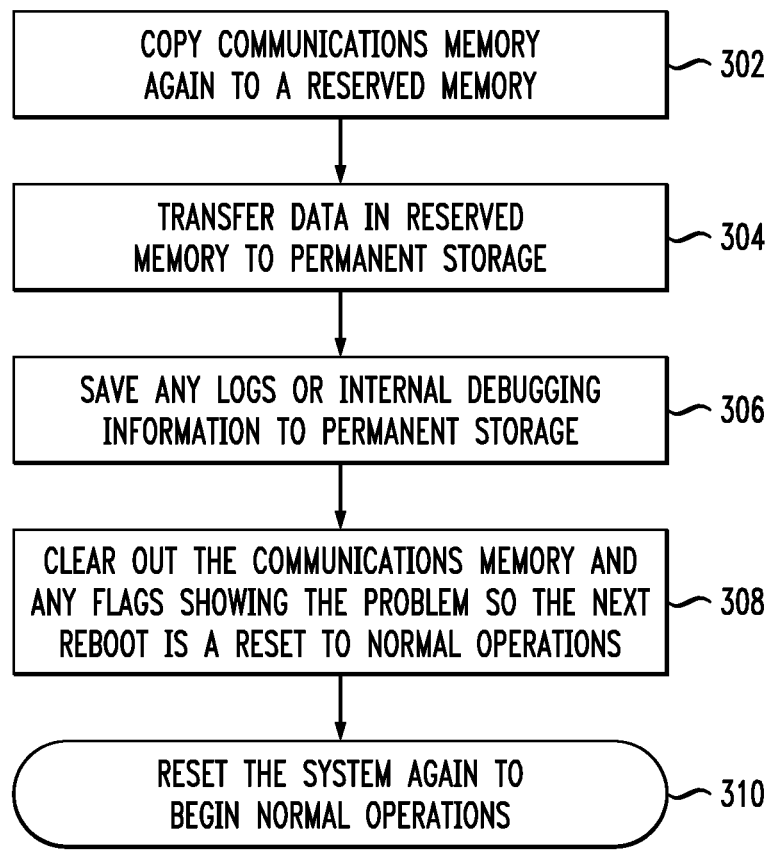

MULTIPROCESSOR SYSTEM HAVING MULTIPLE WATCHDOG TIMERS AND METHOD OF OPERATION

TECHNICAL FIELD

The present invention relates to multiprocessor systems generally, and, in particular, to multiprocessor systems utilizing watchdog timers or the like.

BACKGROUND

A typical computing system may include one or more conventional processors and one or more conventional watchdog timers to provide a "sanity check" for the system, restoring the system to a known condition should one or more of the processors fail. For a single processor system, a presumably "sane" processor will periodically reset the watchdog timer before the timer times-out. However, should the timer time-out because of a fault in the processor, the processor is typically reset and the processor executes recovery software, reestablishing normal operation.

When a multiprocessor system has one or more watchdog timers associated with each processor, system instability might occur should one (or more) watchdog timers time-out. The instability occurs because once the failed processor is reset, the remaining processors may operate incorrectly (e.g., they become "hung") waiting for a response from the failed processor, which, in turn, causes watchdog timers corresponding to the hung processors to time-out, causing other processors to hang, etc.

Therefore, it is desirable to provide a multiprocessor system having watchdog timers respond to a failed processor in a controlled, systematic way.

SUMMARY

In one embodiment, the present invention is a multiprocessor system having a plurality of processors, and a watchdog timer producing a timeout signal at an output thereof. Each processor has an interrupt input coupled to a common node, and the watchdog timer output is coupled to the common node to form a common interrupt signal. The plurality of processors are concurrently responsive to the common interrupt signal.

In another embodiment, a multiprocessor system has a plurality of processors and at least one watchdog timer responsive to one of the plurality of processors. The present invention comprises the steps of asserting a common interrupt signal in response to the watchdog timer timing out; applying the common interrupt signal to the plurality of processors; and storing, by each of the processors responding to the common interrupt signal, data from local memories associated with each of the responding processors into a memory common to all the processors.

BRIEF DESCRIPTION OF THE DRAWINGS

The aspects, features, and advantages of the present invention will become more fully apparent from the following detailed description, the appended claims, and the accompanying drawings in which like reference numerals identify similar or identical elements.

FIG. 1 is a simplified block diagram of an exemplary multiprocessor system having multiple watchdog timers according to one embodiment of the invention; and FIGS. 2 and 3 are simplified flowcharts illustrating an exemplary process for handling watchdog timer time-out in the apparatus of FIG. 1, according to another embodiment of the invention.

DETAILED DESCRIPTION

For purposes of this description and unless explicitly stated otherwise, each numerical value and range should be interpreted as being approximate as if the word "about" or "approximately" preceded the value of the value or range. Further, signals and corresponding nodes, ports, inputs, or outputs may be referred to by the same name and are interchangeable.

Additionally, reference herein to "one embodiment" or "an embodiment" means that a particular feature, structure, or characteristic described in connection with the embodiment can be included in at least one embodiment of the invention. The appearances of the phrase "in one embodiment" in various places in the specification are not necessarily all referring to the same embodiment, nor are separate or alternative embodiments necessarily mutually exclusive of other embodiments. The same applies to the terms "implementation" and "example."

Also for purposes of this description, the terms "couple," "coupling," "coupled," "connect," "connecting," or "connected," refer to any manner known in the art or later developed in which a signal is allowed to be transferred between two or more elements and the interposition of one or more additional elements is contemplated, although not required. Conversely, the terms "directly coupled," "directly connected," etc., imply the absence of such additional elements.

FIG. 1 is a simplified diagram of a multiprocessor system 100 having N processors $102_1$-$102_N$ (N≧1), useful in large storage networks, such as a network attached storage system. Each processor may communicate with one or more of the other processors via conventional communication paths $104_1$-$104_N$ and a communications memory 106. Further, each processor communicates with a common memory 108 via conventional communication paths $110_1$-$110_N$. For purposes here, the common memory 108 is typically composed of conventional dynamic random access memory (DRAM) and is much larger (e.g., $2^{30}$, or about $10^9$, bytes of memory) than the communication memory (e.g., $2^{20}$, or about $10^6$, bytes of fast static random access memory) but having a significantly slower access time compared to the communication memory. It is understood, however, that the communications memory and common memory may be one in the same.

As will be discussed in more detail below, the common memory 108 has a reserved section 108a, referred to herein as a reserved memory. The reserved memory 108a is used to store information for later transfer to "permanent" storage and analysis. The reserved memory 108a may be used for other applications as needed and may be located in another memory, such as the communications memory 106.

In this embodiment, processor $102_1$ is designated a master processor such that this processor controls directly or indirectly all of the other processors. Master processor $102_1$ also is in direct communication with permanent storage system 112, as will be described in more detail below. It is understood that the other processors may also directly communicate with the permanent storage system 112, or one or more of the other processors have their own permanent storage system attached thereto. For purposes here, the permanent storage device 112 is a conventional mass storage system such as a flash memory or a rotating magnetic storage device (a "hard drive").

Further included in multiprocessor system 100 are local memories $114_1$-$114_N$ and watchdog timers $116_1$-$116_N$ associated with corresponding processors $102_1$-$102_N$. Each processor controls a corresponding one or more watchdog timers via corresponding conventional communication paths $118_1$-$118_N$. It is understood that more than one watchdog timer or no watchdog timers may be associated with a given processor.

Each of the watchdog timers $106_1$-$106_N$ has an output TIMEOUT indicating that the timer has timed-out. During normal operation, each processor, e.g. processor $102_N$ controlling corresponding watchdog timer $116_N$, executes software ("code") causing the processor to repetitively reset the watchdog timer to assure that the watchdog timer does not time-out. Typically, each watchdog timer $116_1$-$116_N$ has a set of circuitry, e.g., a programmable counter (not shown), that, in response to a clock signal, asserts the output TIMEOUT after an interval of time has lapsed after being reset (e.g., 1 ms). Should the controlling processor fail to reset the watchdog timer before timing out, that processor is assumed to have failed for any one of a variety of reasons, such as software corruption or hardware failure.

In this embodiment, one or more of the watchdog timer outputs are coupled together to form a common interrupt signal on line or node 120. This interrupt signal is coupled to INT input of more than one of the processors $102_1$-$102_N$. Assertion of the interrupt signal by one of the watchdog timers onto line or node 120 forces those processors to be "interrupted" (if not masked, as described below) and forced to execute certain code to handle this type of interrupt, as described in more detail below in connection with FIGS. 2 and 3. By having a common interrupt or common timeout signal from the watchdog timers applied to the processors, all of the processors responding to the interrupt will respond concurrently without instability resulting from processors responding to individual watchdog timers. It understood that the line or node 120 is shown as a single wire but may comprise various logic circuitry to combine the TIMEOUT outputs from the watchdog timers $116_1$-$116_N$ into a common interrupt signal and distribute the signal to the processors $102_1$-$102_N$.

Referring to FIG. 2, exemplary operation of the processors responsive to the common interrupt signal on line 120 is illustrated. Assuming a given processor is not "masked," i.e., the processor is configured to block or ignore the interrupt signal, each processor executes code to implement the steps 200. Beginning with step 202 and in response to a watchdog timer (e.g., $116_N$) forcing the common interrupt signal, in step 204 a responsive processor (e.g., $102_N$) sets an internal flag to indicate that an interrupt has occurred and, in step 206, the processor determines if the watchdog timer associated with the processor is the watchdog timer asserting the common interrupt. Typically, a given processor (e.g., $102_N$) communicates with its associated watchdog timer (e.g., $116_N$) via the associated communication path (e.g., $118_N$) to read the timer to determine if said timer caused the interrupt. If the associated watchdog timer is the timer asserting the interrupt, then in step 208 a flag is set in the corresponding local memory (e.g., $114_N$), otherwise it is cleared. Along with the data in local memories $114_1$-$114_N$, the flag data is stored in a reserved memory 108a in step 210. As will be explained in below, the data stored in the reserved memory 108a is eventually stored in the permanent storage device 112 for later analysis.

In steps 212-216, data from the communication memory 106, register data from each of the responding processors $102_1$-$102_N$, and certain, pertinent portions of the common memory 108 memory are organized and stored in the reserved memory 108a for later analysis. In step 220, at least the master processor $102_1$ (FIG. 1) is reset after waiting in step 218 for each of the processors $102_1$-$102_N$ responding to the common interrupt signal to complete steps 202-216. Alternatively, a separate timer or another watchdog timer (not shown) can be used to wait a certain amount of time after the interrupt to initiate the reset in case one or more of the processors does not, or is unable to, perform the above steps 202-216.

After the master processor $102_1$ is reset in step 220, a reset routine 300 is executed to restart the multiprocessor system as illustrated in FIG. 3.

Beginning with step 302, the master processor, e.g., $102_1$, again copies the communications memory data to the reserved memory 108a (in case the communication memory data changed after being copied into the reserved memory in step 212) and all data saved to the reserved memory 108a in steps 210-216 (FIG. 2) and 302 are copied to the permanent storage device 112. In step 306, any logs of various processes being executed by the master processor $102_1$ at the time of the interrupt and any internal debugging data are stored in the permanent storage device 112. The data stored in the permanent storage device 112 is used for later analysis, such as determining why the timeout interrupt occurred. Data in the communication memory are cleared in step 308 and flags are cleared in step 308 so that on the next reset in step 310, all of the processors $102_1$-$102_N$ are reset so that they will execute code to restart the entire system and begin normal operation.

It is understood that the processes illustrated in FIGS. 2 and 3 are exemplary and the order of the steps in FIGS. 2 and 3 may be changed, steps deleted, and other steps added, as desired.

Further, it is understood that various changes in the details, materials, and arrangements of the parts which have been described and illustrated in order to explain the nature of this invention may be made by those skilled in the art without departing from the scope of the invention as expressed in the following claims.

The use of figure numbers and/or figure reference labels in the claims is intended to identify one or more possible embodiments of the claimed subject matter in order to facilitate the interpretation of the claims. Such use is not to be construed as necessarily limiting the scope of those claims to the embodiments shown in the corresponding figures.

Although the elements in the following method claims, if any, are recited in a particular sequence with corresponding labeling, unless the claim recitations otherwise imply a particular sequence for implementing some or all of those elements, those elements are not necessarily intended to be limited to being implemented in that particular sequence.

The invention claimed is:

1. A multiprocessor system comprising:
a number of processors, each processor having an interrupt input coupled to a common node; and
the same number of watchdog timers, each of the number of processors being associated with one of the same number of watchdog timers, each watchdog timer for producing a timeout signal at an output thereof, each of the watchdog timer outputs coupled to the common node;
wherein the number of processors are concurrently responsive to the common interrupt signal, wherein each watchdog timer is controlled by a corresponding one of the processors, wherein the timeout signals from each of the watchdog timers are combined at the common node to produce the common interrupt signal, and wherein each processor is adapted to, in response to the common interrupt signal, (i) determine whether a corresponding watchdog timer produced the timeout signal, (ii) identify which of the number of watchdog timers asserted the common interrupt signal, and (iii) store the identity of the timed-out watchdog timer in a common memory accessible by all the processors.

2. The apparatus of claim 1, further comprising:
a number of local memories, each local memory being associated with a corresponding one of the processors;
wherein each processor is adapted to, in response to the common interrupt signal, store data from the corresponding local memory into the common memory.

3. The apparatus of claim 2, wherein the local memory data stored in the common memory is stored in a reserved area of the common memory.

4. The apparatus of claim 3, further comprising: a permanent storage device coupled to one of the processors, wherein the data stored in the reserved area of the common memory is also stored in the permanent storage device.

5. The apparatus of claim 4, wherein at least one of the processors is further adapted to be reset after the data in the reserved area of the common memory is stored in the permanent storage device.

6. The apparatus of claim 1, wherein at least one of the processors is reset after a fixed time subsequent to assertion of the common interrupt signal.

7. The apparatus of claim 1, wherein the interrupt input of at least one of the processors coupled to the common node is maskable.

8. The apparatus of claim 1, wherein the interrupt input of at least one of the processors coupled to the common node is non-maskable.

9. In a multiprocessor system having a number of processors and the same number of watchdog timers, each of the watchdog timers being responsive to a corresponding one of the plurality of processors, a method comprising the steps of:
a) asserting a common interrupt signal in response to the watchdog timer timing out;
b) applying the common interrupt signal to the plurality of processors;
c) storing, by each of the processors responding to the common interrupt signal, data from a local memory associated with each of the responding processors into a memory common to all the processors,
d) determining, by each of the processors responding to the common interrupt signal, whether a corresponding watchdog timer produced a timeout signal;
e) identifying which of the number of watchdog timers asserted the common interrupt signal; and
f) storing the identity of the timed-out watchdog timer in the common memory.

10. The method of claim 9, further comprising the step of resetting at least one of the processors after completing step b).

11. The method of claim 9, further comprising the step of storing the data stored in step b) in a permanent memory.

12. The method of claim 9, further comprising the step of resetting at least one of the processors a fixed time after the assertion of the common interrupt signal.

13. The method of claim 9, wherein the step of identifying the watchdog timer comprises the step of reading status information from each watchdog timer by a corresponding one of the processors.

14. A multiprocessor system comprising:
a number of processors, each processor having an interrupt coupled to a common node;
the same number of local memories, each local memory associated with a corresponding one of the processors;
a common memory accessible by all the processors; and
the same number of watchdog timers, each watchdog timer producing a timeout signal at an output thereof, the outputs of each watchdog timer being combined together and coupled to the common node to form a common interrupt signal;
wherein each of the number of processors are responsive to the common interrupt signal, each watchdog timer is controlled by a corresponding one of the processors, and each processor is adapted to, in response to the common interrupt signal, (i) determine whether a corresponding watchdog timer produced the timeout signal, (ii) identify which of the number of watchdog timers asserted the common interrupt signal, and (iii) store the identity of the timed-out watchdog timer in a common memory accessible by all the processors.

15. The apparatus of claim 14, wherein at least one of the processors is further adapted to be reset after storing the local memory data in the reserved area of the common memory.

16. The apparatus of claim 14, wherein at least one of the processors is further adapted to be reset a fixed time subsequent to the assertion of the common interrupt signal.

* * * * *